United States Patent [19]

Miller et al.

[11] Patent Number: 4,473,594

[45] Date of Patent: Sep. 25, 1984

[54] IMITATION SOUR CREAM DRY BLEND RECONSTITUTABLE WITH MILK

[75] Inventors: Donald E. Miller, Norcross, Ga.; Cecilia Gilmore, Strongsville, Ohio

[73] Assignee: SCM Corporation, New York, N.Y.

[21] Appl. No.: 520,450

[22] Filed: Aug. 4, 1983

[51] Int. Cl.³ .................. A23C 20/00; A23L 1/195
[52] U.S. Cl. .................................. 426/578; 426/583; 426/613; 426/661
[58] Field of Search ............... 426/578, 583, 613, 661

[56] References Cited

U.S. PATENT DOCUMENTS

| | | |
|---|---|---|
| 3,355,298 | 11/1967 | Loter . |
| 3,359,116 | 12/1967 | Little . |
| 3,370,955 | 2/1968 | Little . |
| 3,391,002 | 7/1968 | Little . |
| 3,432,306 | 3/1969 | Edwards . |
| 3,433,643 | 3/1969 | Tatter et al. . |
| 3,437,494 | 4/1969 | Loter et al. . |
| 3,560,220 | 2/1971 | Bangert et al. . |
| 3,563,761 | 2/1971 | Ellinger . |
| 3,666,493 | 5/1972 | Bluemke ......................... 426/578 X |
| 3,792,178 | 2/1974 | Noznick et al. ...................... 426/187 |
| 3,917,875 | 11/1975 | Gardiner .............................. 426/573 |
| 3,955,009 | 5/1976 | Eskritt et al. ......................... 426/578 |
| 3,996,390 | 12/1976 | Igoe ...................................... 426/573 |
| 4,045,589 | 8/1977 | Petrowski et al. ................... 426/609 |
| 4,058,636 | 11/1977 | Igoe ...................................... 426/573 |
| 4,081,566 | 3/1978 | Haber .................................. 426/578 |
| 4,081,567 | 3/1978 | Haber .................................. 426/580 |
| 4,169,854 | 10/1979 | Igoe ...................................... 426/583 |
| 4,254,156 | 3/1981 | DeSocio et al. ............... 426/578 X |
| 4,264,638 | 4/1981 | Sirett et al. .......................... 426/580 |
| 4,342,787 | 8/1982 | Rebaudieres et al. .......... 426/578 X |

*Primary Examiner*—Robert Yoncoskie
*Attorney, Agent, or Firm*—Richard H. Thomas

[57] ABSTRACT

A non-dairy dry blend, suitable for reconstitution with milk to provide an imitation sour cream product having the color, flavor, consistency and texture of natural sour cream. This product is particularly useful as a base in food recipes calling for sour cream, such as baked goods and beef stroganoff.

The dry blend comprises, as essential ingredients, a spray dried coffee whitener formulation emulsified with a mono- diglyceride; a pregelatinized starch; and an acidifying amount of a food grade acid, of which a flavoring amount is acetic acid; and a milk-soluble hydrocolloid gum.

9 Claims, No Drawings

IMITATION SOUR CREAM DRY BLEND RECONSTITUTABLE WITH MILK

TECHNICAL FIELD

The present invention relates to a non-dairy dry blend suitable for reconstitution with milk to provide an imitation sour cream product having the color, flavor, consistency and texture of natural sour cream. The product of the present invention is particularly useful as a base in food recipes calling for sour cream, such as baked goods and beef stroganoff.

The dry blend comprises as essential ingredients a spray dried coffee whitener formulation emulsified with a mono- diglyceride; a pregelatinized starch; and an acidifying amount of a food grade acid, of which a flavoring amount is acetic acid; and a milk-soluble hydrocolloid gum.

BACKGROUND ART

Dry sour cream powders are on the market today, but they are mostly dried, natural, cultured cream to which amounts of other ingredients have been added. Such a sour cream powder is disclosed in Noznick et al U.S. Pat. No. 3,792,178. The patent describes the use of an amount of a sodium, ammonium or potassium phosphate as a protein peptizing agent mixed with cultured sour cream prior to spray drying, to produce a powder readily dispersible in water.

Conventionally, the taste and texture of such products are poor. The reason for this is that sour cream, as with other milk products, looses a lot in the spray drying process, due to the heat employed. Off-flavors are developed, and reconstitution with milk or water becomes difficult. Even with the addition of solubilizing ingredients, such as in the Noznick et al patent, and imitation or natural flavors, the off-flavors are difficult to mask, and the tendency to form a curdy mass makes it difficult to obtain a product having the body, texture, and consistency of natural sour cream.

In a Bangert et al U.S. Pat. No. 3,560,220, it is suggested that some of these difficulties can be overcome by using, as a base, a spray-dried component containing about 40% fat (76° coconut oil), about 12% sodium caseinate, and about 35% acid whey solids.

Also included in the spray-dried component is an emulsifier such as propylene glycol monostearate, and a gum such as carboxymethylcellulose. The spray-dried component is dry blended with citric acid, aluminum potassium sulfate, sodium carrageenan, flavor and colorants. The mix is said to be reconstitutable with milk, and when so reconstituted, is said to have a smooth texture, absence of curdling, and tanginess.

It would appear that a primary objective of this patent is utilization of acid whey, a by-product of cottage cheese. Acid whey contains a very high percentage of lactose, and accordingly is very bitter. At a 35% level, this bitterness also would be difficult to mask. Further, the sodium caseinate is employed at a very high level (12%), and it's flavor would be difficult to mask.

A Petrowski et al U.S. Pat. No. 4,045,589 describes a dry coffee whitener which is protein free and contains a chemically modified dextrinized starch having a lipophillic character. The whitener also contains a fat or oil, and an emulsifier to stabilize the emulsion upon reconstitution in coffee. A buffering agent is mixed with the dried emulsion to improve taste. It is indicated near the end of the specification for the patent that the coffee whitener product "may be used in preparing dried imitation sour cream mix, dried chip dip mix, dried creamy salad dressing mix, and the like. In such products, where an acidic taste is not objectionable, buffering salts need not be dry blended with the dried emulsion concentrate."

The patent gives no listing of other ingredients which may be used in preparing a dried imitation sour cream mix, nor proportions, nor characteristics of the end product. It is not indicated in the patent that such sour cream mix would have utility as a base in food recipes where natural sour cream is conventionally employed. In the present invention, the presence of a protein, in a coffee whitener-type formulation, was found to be critical.

A major problem in making tart tasting products from an acid containing dry mix, by reconstitution with milk, is that the pH of the milk is lowered below the isoelectric point of the milk protein causing curdling. This problem is alluded to in an Eskritt et al U.S. Pat. No. 3,955,009, which proposes that with the use of pregelatinized starch and a hydrocoloid gum, the curdling can be avoided. It is indicated that the pregelatinized starch permits such rapid rehydration and quick setting that the coagulation and curdling of the milk proteins is prevented. The patent is not concerned with the preparation of an imitation sour cream. The principle ingredients in the dry mix are sucrose, pregelatinized starch, citric acid, emulsifier and guar gum. No coffee whitener-type ingredient is used in the Eskritt et al formulation.

Other patents dealing with reconstitution of acid containing dry mixes with milk include Gardiner U.S. Pat. No. 3,917,875; Igoe U.S. Pat. Nos. 3,996,390, 4,058,636 and 4,169,854; Haber U.S. Pat. Nos. 4,081,566 and 4,081,567; and Sirett et al U.S. Pat. No. 4,264,638.

Prior art patents which deal with the preparation of imitation sour creams include Loter U.S. Pat. Nos. 3,355,298 and 3,437,494; Little U.S. Pat. Nos. 3,370,955, 3,359,116, and 3,391,002; Edwards U.S. Pat. No. 3,432,306, and Tatter et al U.S. Pat. No. 3,433,643. These are not dry blends.

The Ellinger U.S. Pat. No. 3,563,761 describes an imitation sour cream containing sodium caseinate, vegetable shortening, corn syrup solids, stabilizers, emulsifiers, and water to bring the composition to 100%. The patent does not describe a dry blend suitable for reconstitution with milk.

No prior patent of which applicant is aware teaches or suggests the use of a casein-containing coffee whitener formulation as a base for the preparation of an imitation, non-dairy sour cream, which is suitable for multiple uses, including sour cream containing food recipes; nor a sour cream dry mix containing the same (a coffee whitener formulation), and acid, reconstitutable with milk.

BRIEF DISCLOSURE OF INVENTION

The present invention resides in an improved non-dairy dry blend, which when reconstituted with milk, provides a stable imitation sour cream having the color, flavor, consistency and texture of natural sour cream. The product of the present invention, when reconstituted with milk, is useful alone, or as a base in the preparation of food recipes calling for natural sour cream. The dry blend of the present invention comprises about 60–70% of a spray-dried, bland, coffee whitener formulation containing a partially hydrogenated vegetable oil preferably having a Wiley melting point in the range of about 92–110° F.; a bulking amount of corn syrup solids having a dextrose equivalent less than about 36; a stabilizing amount of a water dispersible protein such as sodium caseinate; an emulsifying amount of a mono-diglyceride emulsifier; and zero to buffering amount of a buffering salt. The dry blend of the present invention further comprises about 15–25% of a pregelatinized starch; a food grade acid in an amount which on reconstitution with milk provides a pH in the range of about 4.2–4.6, the acid including a flavoring amount of acetic acid; and a thickening amount of a milk-soluble hydrocolloid gum; said whitener formulation, starch, acid and thickening agent being dry blended.

Based on the total blend, dry weight basis, such blend preferably comprises about 25–35% partially hydrogenated vegetable oil; about 25–35% corn syrup solids, about 3–4% sodium caseinate and about 1–1.5% mono-diglyceride emulsifier.

Broadly any casein (or other water dispersible protein) containing spray dried coffee whitener having the formulation indicated above can be employed as a base in the dry blend of the present invention. However, in preferred embodiments, the dried coffee whitener is uniquely tailored to the present invention, specifically containing at least about 45% fat. In addition, the mono-diglyceride emulsifier is the sole emulsifier employed.

BEST MODE FOR CARRYING OUT THE INVENTION

The principal ingredients of the present invention dry blend are (a) a coffee whitener formulation containing a partially hydrogenated vegetable oil, corn syrup solids and sodium caseinate protein; (b) a pregelatinized starch; (c) a food grade acid; and a (d) a thickening amount of a milk-soluble hydrocolloid gum. Important aspects are employing as the sole emulsifier an emulsifying amount of a mono-diglyceride in the coffee whitener formulation; and a flavoring amount of acetic acid, as the food grade acid component. Preferably the coffee whitener formulation contains a partially hydrogenated coconut oil as the vegetable oil, in a relatively high amount of at least about 45% (based on whitener weight). The presence of a buffering agent in the whitener, such as a phosphate salt, also is preferred. A preferred dextrose equivalent for the corn syrup solids is about 24. Above about 36 the taste is detectable.

Properties of the reconstituted sour cream of the present invention are that it be essentially non-flowable at normal use temperature and have stand-up or shortness such that it tends to plop off of a spoon, similar to natural sour cream. The reconstituted mix has the mouth feel, texture, and consistency of true sour cream, achieved by the presence of a relatively large amount of fat. On rehydration, it exhibits no syneresis, has good viscosity, color, flavor, and texture. It should be capable of utilization in all applications where natural sour cream is used, such as pancakes, cakes, dressings, beef stroganoff and other sauces, baked potatoes, and chip dips.

The Coffee Whitener Formulation

There are many coffee whitener formulations on the market which contain a fat or oil, a protein, a bulking agent such as corn syrup solids, an emulsifier and a buffering amount of a buffering agent. A basic patent describing such coffee whiteners is Canada Pat. No. 688,859 to McIntire (dated June 16, 1964). The disclosure of this Canada patent is incorporated herein by reference.

An object in the Canada patent was to provide a dried fat emulsion product formulated of non-dairy ingredients which was capable of dispersing completely in hot coffee with no feathering or free fat appearing on the surface; which was capable of whitening the coffee; and which contributed a pleasing taste and flavor to the finished drink. In the patent, it is also indicated that the creamer can function as a flavor carrier for essential oils and butter flavor, and thereby be used as an ingredient in many formulated foods, such as for example, cream soups.

The essential ingredients of the coffee whitener, in the Canada patent, are about 20–50% (preferably 35%) hydrogenated coconut oil, said to be an excellent fat choice since it contributes to a relatively bland taste and flavor, among other reasons; a water dispersible protein having emulsifying properties, the preferred such protein being sodium caseinate, in an amount of about 3–15%; a water soluble sugar such as sucrose, or corn syrup solids, the latter being preferred because it is less sweet, in an amount of about 35–65%; a buffering agent to counteract the acidity of the coffee such as sodium or potassium phosphate, in an amount of about 1.5%; and an emulsifier, such as mono-diglyceride, diacetyl tartaric acid esters of mono and diglycerides, or combinations thereof, in an amount of about 1–3%. The spray-dried product is prepared by mixing the ingredients with water at a temperature of about 160°–180° F. to prepare a water/fat emulsion, the water and solids being in a ratio of about 40–60%, pasturizing the same at about 160° F. for about 30 minutes, homogenizing the emulsion at a pressure of about 2,500/500 psi, and then subjecting the same to spray-drying procedures, utilizing an inlet temperature in the range of about 300°–350° F. and an outlet temperature of about 175°–225° F. The final product discharges from the spray dryer with a moisture content less than about 5%.

Although in the Canada patent it is indicated that the spray-dried product serves as a coffee whitener, imparting a whitening effect, without "oiling off" or feathering of the fat, difficulties have been experienced with some coffee whiteners as attested to in prior U.S. Pat. No. 4,025,659 (to Cho et al), wherein it is stated:

"Proteins . . . , such as casein, sodium caseinate, etc., when used in coffee whitener formulations, also are subject to such feathering or other non-functionality under some conditions, such as when utilized in amounts less than a prescribed minimum or when subjected to certain harsh coffee environments such as with freeze dried instant coffee."

Also in prior U.S. Pat. No. 4,046,926, to Gardiner, the problem of protein feathering is discussed, and it is stated:

"The problem of feathering is particularly marked where low pH coffees are used, (for example, a pH of 4.5 to 5.0), . . ."

This patent also equates feathering with milk curdling, in the statement:

"Feathering gives an undesirable appearance to a cup of coffee with added creamer and is a somewhat similar phenomenon to milk curdling, when the milk is sour."

In the prior art, a number of solutions have been proposed to obtain increased feathering resistance. In the U.S. Pat. No. 4,046,926 the suggested solution was use of a mixture of sodium carbonate and dipotassium hydrogen phosphate buffer. Many coffee whiteners on the market today employ an amount of a sodium stearyl lactylate emulsifier. The problem with such emulsifier is that it is not food approved for use in sour cream. In this regard, the use of any ingredient or additive in a sour cream dry mix product has to not only take into consideration the efficacy of such use in a spray dried mix, but also the efficacy in all end uses for which the product might be employed. It is a feature of the present invention that the reconstituted sour cream can be used with equal ease in all receipts where natural sour cream is used.

The fat component of the coffee whitener of the present invention preferably is one having little or no polyunsaturates (no unsaturated fatty acids) for optimum shelf stability. Any edible, bland vegetable oil or fat which is plastic or hard at room temperature and is hydrogenated or partially hydrogenated, is broadly within the scope of the present invention. For instance, the present invention has been successfully practiced with a partially hydrogenated cottonseed or soybean oil, marketed under the trademark Duromel, by SCM Corporation. This fat has a Wiley melting point of 101°-105° F. A preferred such fat or oil is a partially hydrogenated coconut oil of 92°-110° F. Wiley melting point, which is storage stable up to about a year. The amount employed in the coffee whitener preferably is about 45% or more, which is more than in conventional whiteners (e.g., 37%), as it was found that a higher fat content provided an improved mouth feel, texture and consistency in the final product, and also made the end product more useful in such items as baked goods. With the use of about 60-70% of the coffee whitener, basis total sour cream dry blend weight, this is at least about 27% fat, basis total dry blend weight.

An example of a hydrogenated coconut oil that can be employed is Hydrol 100, trademark SCM Corporation. This oil has a WMP of about 98°-102° F.

In order to obtain a bland flavor, a low DE corn syrup solids is preferred as the carbohydrate bulking agent. It's primary purpose is to provide a formulation which is spray dryable (that is, function as a bulk carrier for other ingredients), and in this regard, a preferred proportion is about 35-55%. The corn syrup solids also add richness to the final product. As indicated above, the dextrose equivalent can be as high as 36 before the sweetness becomes detectable, although a dextrose equivalent of about 24 is preferred.

A preferred protein in the present invention is a sodium caseinate, since this is very soluble in its solid form, and was found to perform satisfactorily as a stabilizing agent when exposed to the acidic conditions of the reconstituted dry mix. About 4-7% protein, basis coffee whitener formulation is preferred. By "stabilizing amount", it is meant that the amount of protein is sufficient to prevent separation of fat and coalescence of droplets of oil in the form of fat lakes. In this regard, the protein is believed to encapsulate the fat particles, along with the emulsifier, to maintain particle separation, functioning, most likely, similar to its function in hot coffee (notice the Ellinger U.S. Pat. No. 3,563,761, column 5).

The presence of dipotassium phosphate or other buffering agent is preferred, as it is believed to have some beneficial effect in buffering the acid present and reducing precipitation of sodium caseinate protein. The amount used preferably is about 2-3%, basis whitener formulation weight.

In this regard, as indicated, the amount of acid present is sufficient to obtain a pH of about 4.2-4.6 which is substantially lower than in a coffee environment. it is surmised that the phosphate buffers the caseinate and that the bulk of the precipitation is with the more easily precipitable colloidally dispersible milk casein.

It has previously been stated that an important ingredient of the coffee whitener base is a monodiglyceride emulsifier which permits the reconstituted sour cream of the present invention to be used alone, as well as in many different types of foods, for instance baked goods. It is illegal to use other emulsifiers as sodium stearyl lactylate in a sour cream dry mix, and the discovery of the present invention was that the mono-diglyceride alone surprisingly performed very well under the conditions of reconstitution in the presence of acid, as well as being a universally good emulsifier in other applications, for instance, baked goods.

An important advantage is that the mono-diglyceride is bland in flavor. It, thus, provides good functionality in uses such as cakes and stroganoff, and in addition, satisfactorily solublizes the dry blend in cold milk. A preferred amount is about 1.5-2.5%, basis whitener formulation weight.

Any hard or soft mono-diglyceride can be employed in the practice of the present invention. One suitable such mono-diglyceride is Dur-em 204 (trademark SCM Corporation), a 52% mono having an IV of 65-75 and a Capillary Melting Point of 114°-21° F. The emulsifier is plastic in consistency. Another suitable mono-diglyceride is Dur-em 114 (trademark SCM Corporation) having an IV of 65-75, a Capillary melting point of 110°-120° F., and a mono content of 40% minimum. This emulsifier is also plastic in consistency. A hard mon-diglyceride is Dur-em 117 (trademark SCM Corporation) having 40% mono, an IV of 5 max. and a Capillary melting point of 145°-150° F.

The method for preparing the spray-dried coffee whitener formulation is as disclosed in Canada Pat. No. 688,859, described above.

An example of a coffee whitener formulation which can be used in the present invention is:

|  | Broad Range (Approx.) | Preferred (Approx.) |
|---|---|---|
| Hydrogenated Coconut Oil W. M. P. 92° F.-111° F. | 20-52% | 45-52% |
| Corn Syrup Solids D. E. 24 or 36 | 35-65% | 35-55% |
| Mono-Diglyceride | 1-3% | 1.5-2.5% |
| Buffering Agent, e.g., Dipotassium Phosphate | 0-3% | 2-3% |
| Sodium Caseinate | 3-15% | 4-7% |
| Moisture | Less Than 35% | |

The coffee whitener should possess a light, cream color, and have no off-flavor.

PREGELATINIZED STARCH

The pregelatinized starch is employed in an amount of about 15–25% based on the entire weight of the dry blend. The use of pregelatinized starch is important for its cold milk solubility, permiting rapid rehydration. It was discovered that the pregelatinized starch gave an excellent mouth feel simulating the mouth feel of sour cream. The use of a gum such as carboxy methylcellulose would give too gummy a mouth feel. The proportions are also critical. Too much starch causes the sour cream to take on the characteristics of a pudding, with too much stand-up, and too little starch causes the reconstituted product to be grainy and stringy.

A number of pregelatinized starches will function in the sour cream composition of the present invention. One suitable starch is "Instant Pure Flo F"(trademark, National Starch & Chemical Corporation), a finely ground pregelatinized starch refined from waxy corn. It has a pH of approximately 6 and a moisture content of about 8%. It's color is white to off-white, and it is recommended for use in food applications where immediate viscosity, coupled with smoothness, is desired.

HYDROCOLLOID GUM

The hydrocolloid gum is preferably employed in an amount of about 1–2% to provide additional thickening. Too much gum causes the product of the present invention to be stringy. The gum increases the viscosity and body of the reconstituted product, without creating a gel. It is important that the gum be cold milk soluble, and some hydrocolloids function well in milk and others don't. A preferred such gum is a blend of xanthan gum and guar gum, the xanthan gum providing increased viscosity, when used in small amounts, the guar gum providing added shortness and stand-up. One suitable gum employed in the product of the present invention is K9B44 stabilizer (marketed by Kelco, Division of Merck & Company, Inc.) comprising a blend of guar, xanthan, carrageenan, and locust bean gum. The product has a particle size such that at least 100% passes through 28 mesh screen and 94% through a 40 mesh screen. It offers a viscosity in a 0.75% solution of 1,000–1,400 cps at about 15° C.

ACID

The acid employed in the present invention can be any food grade acid such as lactic acid, acetic acid, citric acid, malic acid, and blends of the same. However, a preferred acid was found to be a flavoring proportion of vinegar solids which surprisingly enhanced the sour cream flavor, without giving a pickle flavor. However, too much vinegar acid would provide a pickle flavor, so the vinegar acid is preferably employed in combination with another food grade acid, such as citric acid, to give the desired acidity to a pH of about 4.2 to 4.6.

A flavoring amount of vinegar solids is about 0.5–1.0% basis total blend weight.

One suitable acid employed in the present invention is Beatreme 3455K (trademark Beatrice Foods), a spray dried vinegar powder containing malto dextrin, food starch modified, and vinegar solids.

The use of the vinegar powder in combination with about 3.5–4.5% citric acid (anhydrous) provides an excellent tart sensation as well as enhanced sour cream flavor.

EXAMPLE 1

In this example, the following formulation was employed:

| INGREDIENTS FORMULA | PERCENT |
| --- | --- |
| 1. Coffee whitener | 64 |
| 2. "Pure Flo F." Instant starch (pregelatinized) | 20 |
| 3. Beatreme 3455K (vinegar powders) | 7 |
| 4. Anhydrous Citric Acid | 4 |
| 5. Blend of hydrocolloid gums | 1.8* |
| 6. Flavors and colorants | Balance |
| Total | 100 |

*About 1.25% of this is guar gum and about .55% xanthan gum. Carrageenan and locust bean gum are present in small amounts.

The coffee whitener formulation contained about 47% hydrogenated coconut oil, about 42% corn syrup solids (D.E. 24, about 1.7% mono-diglyceride, about 2.5% dipotassium phosphate and about 5.75% sodium caseinate. It was prepared following the formulation given above. it was then dry blended with other ingredients using a conventional ribbon blender.

The following is a list of ingredients and proportions in the dry blend product:

| INGREDIENT | Approx. Percent |
| --- | --- |
| 1. Partially hydrogenated coconut oil | 29 |
| 2. Corn syrup solids | 27 |
| 3. Pregelatinized food starch | 20 |
| 4. Citric acid | 4 |
| 5. Sodium caseinate | 3.7 |
| 6. Guar gum, xanthan gum, carrageenan, locust bean gum | 1.8 |
| 7. Dipotassium phosphate | 1.5 |
| 8. Mono- and diglycerides | 1.1 |
| 9. Vinegar powders (Beatreme 3455K) | 7* |
| 10. Silicon dioxide | .4 |
| 11. Flavors and colorants | Balance |
| | 100 |

*Beatreme 3455K contains about 10% acid and maltodextrin and modified food starch in the ratio of about 60:40, so that the actual percentage of vinegar in the blend is about .7%. The powder has a titratable acidity of 9% minimum.

The end product, when reconstituted with one (1) cup of whole milk per 1.4 ounces of dry blend, exhibited no syneresis, had good viscosity, color, flavor and texture. It had a pH of about 4.2–4.6, and at this pH no lumpiness or caseinate protein precipitation was noted. It was essentially non-flowable at normal use temperature and had stand-up or shortness such that it tended to plop off of a spoon, similar to natural sour cream. The reconstituted mix had the mouth feel, texture, and consistency of natural sour cream, achieved by the presence of a relatively large amount of fat. It was capable of successful utilization in all applications where natural sour cream is used, such as pancakes, cakes, dressings, beef stroganoff and other sauces, baked potatoes, and chip dips. Of particular note was a distinct sour cream flavor enhanced by or complimented with the use of a flavoring amount of acetic acid.

We claim:

1. A non-dairy dry blend suitable for reconstitution with milk to provide a stable imitation sour cream having the color, flavor, consistency and texture of natural sour cream, comprising (a) about 60-70% of a spray-dried, bland, coffee whitener formulation which in turn comprises
  (1) a partially hydrogenated vegetable oil;
  (2) a bulking amount of corn syrup solids having a dextrose equivalent less than about 36;
  (3) a stabilizing amount of a water dispersible protein;
  (4) an emulsifying amount of a mono-diglyceride emulsifier; and
  (5) zero to a buffering amount of a buffering salt;
(b) about 15-25% pregelatinized starch;
(c) a food grade acid in an amount which on reconstitution with milk provides a pH in the range of about 4.2-4.6, the acid including a flavoring amount of acetic acid; and
(d) a thickening amount of a milk soluble hydrocolloid gum.

2. The dry blend of claim 1 wherein said vegetable oil has a Wiley melting point in the range of about 92°-110° F. and is present in the coffee whitener in the amount of at least about 45%.

3. The dry blend of claim 2 wherein said vegetable oil is coconut oil.

4. The dry blend of claims 1, 2 or 3 wherein said mono-diglyceride is the sole emulsifier employed.

5. The dry blend of claim 4 reconstituted with milk to produce an imitation sour cream.

6. The dry blend of claims 1, 2 or 3 wherein said coffee whitener formulation consists essentially of about 45-52% hydrogenated vegetable oil, about 35-55% corn syrup solids, about 1.5-2.5% mono-diglyceride emulsifier, about 2-3% buffering agent and about 4-7% sodium caseinate.

7. A non-diary dry blend suitable for reconstitution with milk to provide a stable imitation sour cream having the color, flavor, consistency and texture of natural sour cream, comprising
  partially hydrogenated vegetable oil in range of about 25-35%;
  corn syrup solids in range of about 25-35%;
  pregelatinized food starch in range of about 15-25%;
  water dispersible protein in range of about 3-4%;
  mono-diglyceride in range of about 1-1.5%;
  hydrocolloid gum in range of about 1-2%;
  food grade acid in amounts to produce a pH 4.2-4.6 on reconstitution with milk
  said food grade acid comprising a flavoring amount of acetic acid.

8. The blend of claim 7 wherein said oil, corn syrup solids, protein, and mono-diglyceride are in the form of a co-dried powder.

9. The blend of claim 8 further containing a buffering amount of a buffering salt.

* * * * *